(12) United States Patent
Howald et al.

(10) Patent No.: US 6,767,696 B2
(45) Date of Patent: Jul. 27, 2004

(54) SCANNING TIP AND PROCESS FOR ITS PRODUCTION AND USE, PARTICULARLY FOR A SCANNING PROBE MICROSCOPE

(75) Inventors: Lukas Howald, Dornach (CH); Loris Scandella, Pratteln (CH); Urs Staufer, Neuchatel (CH); Terunobu Akiyama, Neuchatel (CH)

(73) Assignee: Nanosurf AG (CH)

( * ) Notice: Subject to any disclaimer, the term of this patent is extended or adjusted under 35 U.S.C. 154(b) by 169 days.

(21) Appl. No.: 09/873,664

(22) Filed: Jun. 4, 2001

(65) Prior Publication Data

US 2001/0050342 A1 Dec. 13, 2001

(30) Foreign Application Priority Data

Jun. 5, 2000 (DE) .......................................... 100 27 060

(51) Int. Cl.$^7$ .............................................. G12B 21/22
(52) U.S. Cl. ...................................... 430/320; 73/105
(58) Field of Search ................................ 250/306, 307; 73/105; 216/2, 11; 430/320; 438/48, 52

(56) References Cited

U.S. PATENT DOCUMENTS

| | | | | | |
|---|---|---|---|---|---|
| 3,644,134 | A | * | 2/1972 | Widmann et al. ............... 430/5 |
| 4,587,202 | A | * | 5/1986 | Borysko ...................... 430/320 |
| 4,943,719 | A | * | 7/1990 | Akamine et al. ........... 250/306 |
| 5,057,401 | A | * | 10/1991 | Borysko et al. ............. 430/320 |
| 5,239,863 | A | * | 8/1993 | Kado et al. .................... 73/105 |
| 5,253,515 | A | * | 10/1993 | Toda et al. .................... 73/105 |
| 5,461,907 | A | * | 10/1995 | Tench et al. ................... 73/105 |
| 5,587,090 | A | * | 12/1996 | Belcher et al. ................ 216/17 |
| 5,936,237 | A | * | 8/1999 | Van der Weide ............ 250/234 |
| 6,358,426 | B1 | * | 3/2002 | Muramatsu et al. .......... 216/11 |
| 6,504,151 | B1 | * | 1/2003 | Mitchell et al. ............. 250/306 |

FOREIGN PATENT DOCUMENTS

| | | |
|---|---|---|
| DE | 43 14 301 | 5/1994 |
| DE | 19718177 | 11/1998 |
| WO | WO 99/56176 | 11/1999 |

OTHER PUBLICATIONS

Gregory Kovacs, Micromachined Transducers Sourcebook, 1998, McGraw–Hill, pp. 146–148.*
Nadim Maluf, An Introduction to Microelectromechanical Engineering, 2000, Artech House, pp. 192–196.*

* cited by examiner

*Primary Examiner*—Lamson Nguyen
*Assistant Examiner*—Blaise Mouttet
(74) *Attorney, Agent, or Firm*—Bachman & LaPointe, P.C.

(57) ABSTRACT

The invention relates to so-called scanning tips of probes necessary for scanning a measured object, in particular in scanning force microscopes and other scanning microscopes, so-called scanning probe microscopes. The possible resolution of such microscopes depends primarily on the fineness of the tip, i.e. its curvature or radius being as small as possible. According to the invention, a photostructurable material, e.g. a photosensitive resists, serves as the material for the scanning tip which is exposed via a mask and is subsequently developed/hardened in a manner known per se. The unexposed parts of the photosensitive resist are removed as usual. By the shape of the exposure mask, the preferably directed exposure of the photosensitive resist, and the subsequent hardening, a tip is formed preferably laterally on or at a carrier, usually made from a different material, which is provided with a very small radius, thus very well suitable for scanning probe microscopy and similar applications. By an appropriate selection of the mask and/or the exposure angle, the geometry of the tip can be controlled, in particular its bending radius and edge angle, for other applications as well, e.g. for measuring scanners or profile meters.

15 Claims, 1 Drawing Sheet

Figure 1:
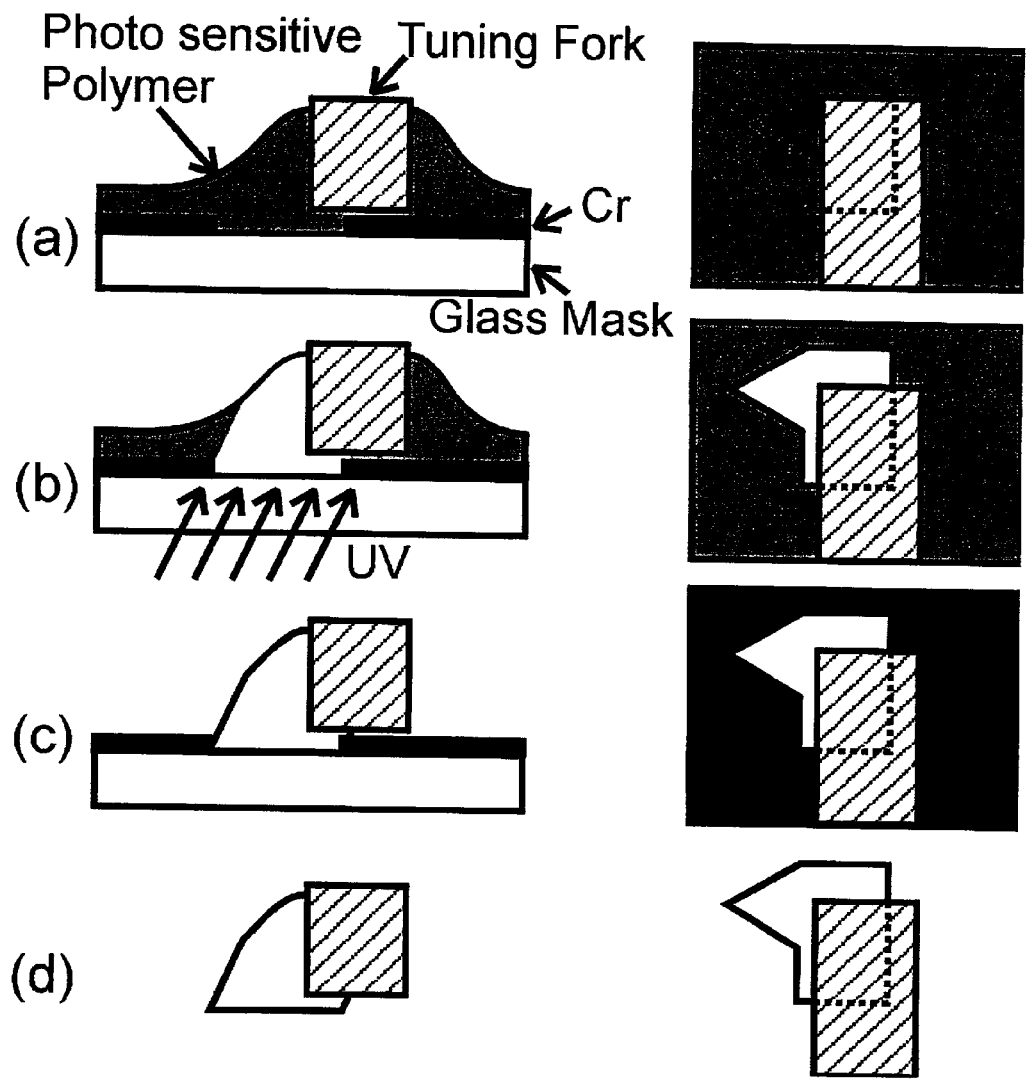

SCANNING TIP AND PROCESS FOR ITS PRODUCTION AND USE, PARTICULARLY FOR A SCANNING PROBE MICROSCOPE

TECHNICAL FIELD OF THE INVENTION

The invention relates to so-called scanning tips in probes for scanning a measured object as are in particular necessary for scanning force microscopes and other scanning microscopes, so-called scanning probe microscopes. In such microscopes, the achievable resolution is primarily dependent on the fineness of the tip, i.e. the curvature or radius of the outermost tip being as small as possible. In detail, the invention relates to a novel method for producing such scanning tips, probes having scanning tips produced according to said method, and, finally, the use of such scanning tips in a scanning probe microscope.

PRIOR ART

In scanning probe microscopy, a scanning tip commonly picks up the interaction of a probe and a measured object, i.e. a specimen, and leads the result to a suitable electronic. For scanning the specimen, essentially two methods are used. On the one hand, the so-called static mode in which the probe is mounted on an oscillating beam or cantilever and is in a fine contact with the specimen (actually almost without any contact), and on the other hand, the dynamic mode, in which the probe is mounted on a mechanical resonator and oscillates closely above the specimen surface. In the static mode, the excursions of the oscillating beam are evaluated, in the dynamic mode, however, the modifications in frequency or amplitude of the oscillation. The modifications in frequency or amplitude can be caused by an acoustic coupling of the probe and the specimen, the so-called acoustic near-field microscopy, or by atomic forces between the probe and the specimen, having a considerably higher resolution reaching molecular and atomic resolution, so-called force microscopy or atomic force microscopy, commonly abbreviated as AFM. In all of these microscopes, the resolution achieved is dependent to a large extend on the fineness of the scanning tip, i.e. on the radius of the outermost tip, opposite to the specimen, being as small as possible.

It is therefore obvious, that rather expensive processes for producing such scanning tips are being developed and great care is required in order to be able of producing the extremely small tip radius desired. Examples can be found in the publications of O. Wolter et al.: "Micromachined Silicon Sensors for Scanning Force Microscopy", published in the Journal of Vacuum Science and Technology B, Vol. 9(2), (March/April 1991), pages 1353 ff. Frequently, the tips are integrated into other components of the microscope, in particularly embodied as parts of the probe, requiring rather complex production procedures.

A method for producing a so-called cantilever for an AFM, i.e. an oscillatory arm, is e.g. described in Muramatsu U.S. Pat. No. 5,877,412 having a single crystalline quartz tip integrated into its end. Here, the scanning tip is completely integrated into the cantilever, i.e. is a part of the cantilever. In the above-mentioned patent the complex production method of such a probe is described in detail.

In Karrai et al. U.S. Pat. No. 6,006,594, a probe for an AFM is shown with its scanning tip comprising a tungsten tip glued onto a cantilever. Here, the scanning tip is produced as a separate component and then connected with another component of the probe, namely the oscillating cantilever, whose frequency modification represents the measured variable.

In the IEEE Journal of Microelectromechanical Systems, Vol 8(1) 1999, pages 65–70 T. Akiyama et al. show a process in which silicon tips are transferred onto a cantilever by means of a batch process.

Finally, in Rev. Sci. Instr., Vol 70, 1999, pages 2398 ff, G. Genolet et al. describe an interesting production method for entire cantilevers made from photosensitive resist with, in a way, the scanning tip being integrated in a photosensitive resist—cantilever for scanning probe microscopes. The overall object of the solution shown aims at the production of economical cantilevers, several of which are arranged in a plate holder of sorts. In case of the "active" cantilever becoming damaged it is mechanically broken off and removed. Then the "reserve" cantilever is drawn out of the plate holder into the scanning position and activated.

The processes described for producing scanning tips onto cantilevers or adhering thereto have in common that they are more or less complex, and that presently their tips can only be produced in a vacuum, in clean rooms, in molds, or under similarly limited circumstances. This causes the production to be tedious and expensive. Processes in which the tips are retrofitted onto a previously, in a way finished cantilever present a somewhat facilitated method, however, the processes known for retrofitting tips (in a parallel process) onto existing oscillating elements or cantilevers are characterized such that the tips must be erected perpendicularly to the level in which the oscillating elements are positioned.

THE INVENTION

As indicated above, the object of the present invention is to provide a method for producing scanning tips and similar devices which is easier, and thus more economical, than conventional production processes. The retrofitting of scanning tips onto existing structures shall be possible as well. Here, no compromises should be made in the quality of the scanning tips or their suitability for high resolution measuring. The particular advantage of the method is its possibility to laterally mount tips onto existing structures, i.e., on the same level as existing structures in a parallel process.

Generally speaking, the invention comprises in a photosensitive resist being used as the material for the scanning tip, more generally, a material able to be photo-structurable is used and a tip having a radius suitable for scanning probe microscopes is produced by exposing such material and subsequently developing it. In the following, such scanning tips are called "plastic tips".

In the above-mentioned process according to Genolet, a mechanical forming for structuring occurs perpendicular to the surface of the substrate, the process according to the invention uses a directed "diagonally angled" photo exposure for the forming process and the tip structure, in particular, is provided laterally at the existing element, e.g., the cantilever. In particular, the latter results in an advantage not achievable with conventional methods, as described further below.

Furthermore, the invention comprises a process for producing such plastic tips directly onto quartz cantilevers in a parallel process, preferably using the so-called SU-8 photosensitive resist as the tip material, based on an epoxy resin and utilized primarily in microtechnology, here mostly as a corroding mask.

Additionally, the invention relates to the plastic tips produced and their use, in particular in scanning probe microscopy.

The unconventional approach of the invention consists in a different purpose and a novel result of an intermediate step and the material of the special production technology utilized therefor, here the semiconductor production. Although being already indicated in the publication of Genolet et al., it is not consequently followed through, however. Primarily, the possibility of producing (or repairing) in situ is not recognized at all by Genolet, since a completely oppositional approach was selected, namely the one of a shiftable reserve. "In situ" means here that the plastic tips can be formed onto an already existing (mass-produced) structure.

Thus, a particular advantage was not utilized at all by Genolet et al., namely that the processing of the photosensitive resist material can be performed in a normal environment, i.e. without a vacuum, highly clean room, or similar restrictions.

Another, rather general advantage is the enormously high technical standard of production processes presently achieved for microelectronics. This technology and the facilities required here are common and, thus can be reasonably purchased in high quality.

The invention can easily be adjusted to different conditions and can be modified in a simple manner. Therefore, it can be used for the production of scanning tips and for the mounting of additional tips onto a probe as well. On the other hand, the invention can also be used to produce or repair micromechanical sensors or probes that are used in other devices than scanning probe microscopes, e.g., in profile meters and measuring scanners. In the latter, an extremely small tip bending radius is not necessarily deciding, but frequently an optimally controlled geometry of the tip. This can easily be performed in the process according to the invention by embodying the mask accordingly, i.e. its shape and size, and, accordingly, by choosing the angle at which the exposure of the photo-structurable material occurs.

The invention is particularly suitable for the production of high-end cantilevers by retrofitting the tips onto comparatively inexpensive, mass-produced tuning fork quartzes.

Due to the possibility of a lateral mounting at the cantilever, the tip can additionally be already mounted when the cantilever, together with a multitude of identical ones, is still "in situ" in the wafer, again allowing precise and inexpensive mass production.

Additional uses and embodiments result from the following description of the exemplary embodiment and from the claims.

EXEMPLARY EMBODIMENT

In the following, an exemplary embodiment of the invention is described in greater detail using the drawing in which FIGS. 1a–1d show various processing steps, and finally the result of these steps.

First the mask is prepared. As mentioned above, for the utilization in an AFM the bending radius of the scanning tip is the deciding quality criteria: the smaller, the better. The sharpness of the tip depends primarily on the measures and the layout of the masks used. A quartz mask is best suited for an optimal lithographic resolution. The best results were achieved in a square 5-inch mask, divided into four sections. This is called for since a) the mask must be small to such an extent that it fits into the narrow space of the aligning device used, when the latter is tilted; and
b) this way, essentially four identical masks are produced in a single processing step.

The producer of the masks certifies an opening of 0.7 $\mu$m on the most critical position or edge. This measurement should be as small as possible in order to achieve tips as sharp as possible. This measurement could even be reduced by electron beam lithography and/or proximity effects, however, such expense is not always necessary.

In the next step, the cantilever or the component onto which the tip should be mounted is prepared. In FIG. 1a this cantilever is called a "tuning fork". In the example shown and described, a corresponding semiconductor wafer is cleaned using $H_2SO_4+H_2O_2$ in order to remove any organic material from the surface. Preferably, the provided primer is used for the photosensitive resist material, here EPON SU-8 (e.g., from the companies Micro Resist Technology or SOTEC), since gold is not affected or removed by $H_2SO_4$, for instance. The wafer can be inserted into it and, subsequently, be dried, or the wafer can be exposed to the primer being in a gaseous state.

The process per se, described here exemplary, is as follows. On the left side of each of the figures, the respective processing step is shown in a cross section; on the right side, however, in a plan view.

The mask ("glass mask" in FIG. 1a) is dried for 30 minutes at 200° C. This is only necessary when no primer is used.

A thin layer of Hexamethyldisilizane (HMDS) is applied onto the mask. This layer prevents a good adhesion of the SU-8 photosensitive resist and, thus facilitates the separation and of the photosensitive resist block subsequently produced. In the example, HMDS was twice applied in a known fashion from a gaseous phase.

The cantilever wafer ("tuning fork" in FIG. 1a) is set onto the mask and positioned. This can be done manually under an optical microscope.

Now the photosensitive resist is applied. In the example, first the cantilever wafer is held onto the mask by means of a few drops of the photosensitive resist, and then the larger amount of the photosensitive resist is applied by so-called spin coating. Here, for the duration of 5 seconds 500 rotations/minute and for the duration of 60 seconds 2000 rotations/minute were used exactly. However, it is also possible to apply the photosensitive resist without any spin coating by applying some drops and tilting the wafer in an accordingly sloped manner, so that the photosensitive resist can spread.

Then, the wafer is preheated on a heating plate. Here, for avoiding undesired bubbles in the photosensitive resist, it is necessary to gradually increase the temperature, for instance by bringing the heating plate from 40° C. to 95° C. within of 10 minutes and then keeping it at 95° C. for the duration of 70 minutes. The subsequent cooling must occur carefully, as well. Preferably, a heating plate is used that can be programmed.

Subsequently, the photosensitive resist is exposed, as shown in FIG. 1b. In the example, an exposure of 250 $mJ/cm^2$ is performed for approximately 18 seconds. Here, by means of small metal frames (or other suitable measures), the mask is held such in reference to the UV-source that the photosensitive resist is exposed to the UV-light at an angle of 30 degrees. A simple UV-lamp can be used at an appropriately tilted angle.

Subsequent to the exposure, the heating occurs either for the duration of 10 minutes at 120° C. or for the duration of 60 minutes at 50° C., each on a heating plate. In both cases, the polymerization occurs flawlessly. The higher temperature obviously creates higher thermal stress which in turn facilitates the separation of the blocks of photosensitive resist from the mask. However, the higher thermal stress can lead to cracks in the semiconductor wafer, as well.

Subsequently the development of the photosensitive resist occurs at room temperature in propylene glycol monomethylether-acetate (PGMEA, e.g. by the company FLUKA). In the example, the development lasted approximately 12 hours; overall this seems to cause no problems. In the development solution, the photosensitive resist should be directed downwards.

Subsequently, the wafer is cleaned with isopropyl alcohol and then dried. This is shown in FIG. 1c.

Now the wafer (the "tuning fork") is mechanically separated from the mask onto which it adheres by means of photosensitive resist residue. The finished wafer with its new tip is shown in FIG. 1d and can now be used.

It is clearly discernible from the above statements that the process according to the invention can be used on existing structures without any severe difficulties since neither extreme temperatures are necessary nor restrictions occur to a large extent. It is discernible as well that the process requires no boundary conditions to be maintained extremely exactly, so that the successful creation of a tip or another shape to be produced, regardless for which purpose, is provided with a large probability. Further, the process can be used outside of clean rooms within normal laboratory environments.

This simple and robust process can certainly be modified maintaining a principally equivalent or similar function, which a person skilled in the art should be able to perform without any problem. For example, the highly soluble (negative) photosensitive resist material EPON SU-8, described in the above-mentioned example and proven particularly well suited can be replaced by the (positive) AZ 4262 or 4562 of the Hoechst company.

Also, the angle of 30° for the directed diagonal exposure listed in the exemplary embodiment is not always the ideal angle for best results, however, depending on size and shape of the mask and the photosensitive resist tip desired it must be modified accordingly. However, it is important that the exposure does not occur perpendicularly but diagonally to the cantilever surface.

It is obvious as well that the process can be performed parallel in a way, as mentioned in the outset, at a multitude of cantilevers being positioned still undivided in the wafer at the end of their production process, by using a multiple mask according to the invention embodied respectively and, thus a multitude of tips can be produced parallel.

Tips of photosensitive resist according to the invention have proven particularly suitable for microscoping soft specimen, i.e. specimen with an elastic or plastic surface, such as for example occurring when examining organic material and tissue. For examining in a vacuum, probes having photosensitive resist tips according to the invention have proven extremely advantageous as well.

The use of photosensitive resist tips with larger bending radius and/or certain edge angles can be necessary for other applications than scanning probe microscopy, for example for profile meters or measuring scanners for certain purposes. This has been mentioned above. It should be possible without problems for one trained in the art, in such cases to design the exposure masks accordingly and, in particular, to select the exposure angle such that the desired tip profile is created. It is also possible to further adjust the profile design by variating the photosensitive resist used for the given needs.

These and other additions and modifications shall also be encompassed by the following claims.

What is claimed is:

1. A process for producing and/or repairing very fine tips made of a photostructurable material on a carrier, characterized in that
    the carrier is positioned on a first side of an exposure mask whose exposure section correlates to the tip to be produced or repaired,
    the photostructurable material is applied onto the first side of the exposure mask and/or the carrier,
    an exposure of the photostructurable material occurs via the exposure mask from a second side opposite the first side,
    the exposed photostructurable material is hardened and the unexposed material removed, and
    the carrier with the tip and the exposure mask are separated from one another.

2. The process according to claim 1, characterized in that the exposure occurs in a directed manner in a direction diagonal or inclined towards the tip.

3. The process according to claim 2, characterized in that the exposure occurs at an angle of approximately 30° to a perpendicular line in relation to the exposure mask and/or to the surface of the carrier.

4. The process according to claim 1, characterized in that the tip to be produced or repaired is positioned on top of the exposure mask.

5. The process according to claim 1, characterized in that prior to the positioning of the carrier a small amount of the photostructurable material is applied onto the exposure mask so that the carrier adheres to the mask.

6. The process according to claim 1, characterized in that a separation layer is provided for a facilitated separation of the carrier having the tip from the exposure mask.

7. The process according to claim 1, characterized in that SU-8 is used as a structurable material and that a spin coating is used for its application.

8. The process according to claim 1, characterized in that the exposure mask is made from quartz and the exposure section provides the tip with a radius of less than 1 μm.

9. The process according to claim 8, characterized in that the exposure mask is made from quartz and the exposure section provides the tip with a radius of approximately 0.7 μm.

10. The process according claim 1, characterized in that the shape and section of the exposure mask and/or the exposure angle are selected such that a tip develops having a predetermined radius and/or edge angle.

11. A process for producing and/or repairing very fine tips made of a photostructurable material on a carrier, comprising:

providing a multitude of carriers positioned on a wafer in an undivided manner, arranging an exposure mask provided with a multitude of exposure sections positioned in correspondence with the multitude of carriers so that the carriers are positioned on a first side of the exposure mask, applying said photostructurable material onto the first side of said exposure mask and/or said carriers, conducting a simultaneous, inclined or diagonal exposure of all said provided carriers on said wafer from a second side, opposite the first side, of said exposure mask, hardening said exposed photostructurable material and removing any unexposed photostructurable material to form said fine tips, and separating said exposure mask from the wafer.

12. A probe for a scanning probe microscope, comprising a carrier and a tip of a hardened photosensitive resist produced and/or mounted laterally at or on a said carrier and offset from the center of said carrier, the latter forming the cantilever of a said scanning probe microscope.

13. The probe according to claim 12, wherein the tip consists of photosensitive resist and is fabricated by a process for making photoresist etch masks in the production of semiconductors.

14. The probe according to claim 12, wherein the carrier comprises or is made of a semiconductor or quartz material.

15. A scanning probe microscope, in particular for the examination of so-called soft specimen and/or in a vacuum or at low pressure, comprising a probe having a cantilever and a tip of a hardened photosensitive resist produced and/or mounted laterally at or on said cantilever and offset from the center of said cantilever.

* * * * *